United States Patent
Roussey et al.

(10) Patent No.: US 10,450,057 B2
(45) Date of Patent: Oct. 22, 2019

(54) ELECTROMECHANICAL ACTUATOR FOR CONTROLLING THE MOVEMENT OF A MOVING OUTER PART OF AN AIRCRAFT, AND AIRCRAFT INCLUDING ONE SUCH ELECTROMECHANICAL ACTUATOR

(71) Applicant: LORD SOLUTIONS FRANCE, Pont de L'sere (FR)

(72) Inventors: Bastien Roussey, Tain l'Hermitage (FR); Pierre Bettini, Saint-Peray (FR)

(73) Assignee: LORD SOLUTIONS FRANCE, Pont de l'Isere (FR)

( * ) Notice: Subject to any disclaimer, the term of this patent is extended or adjusted under 35 U.S.C. 154(b) by 261 days.

(21) Appl. No.: 15/158,172

(22) Filed: May 18, 2016

(65) Prior Publication Data

US 2016/0340030 A1 Nov. 24, 2016
US 2019/0225326 A9 Jul. 25, 2019

(30) Foreign Application Priority Data

May 18, 2015 (FR) .................................. 15 54398

(51) Int. Cl.
*B64C 25/20* (2006.01)
*H02K 5/12* (2006.01)
(Continued)

(52) U.S. Cl.
CPC ............. *B64C 25/20* (2013.01); *B64C 25/24* (2013.01); *H02K 5/12* (2013.01); *H02K 7/06* (2013.01); *H02K 7/14* (2013.01); *H02K 2205/09* (2013.01)

(58) Field of Classification Search
CPC .......... B64C 25/20; B64C 25/24; H02K 5/12; H02K 7/06; H02K 7/14; H02K 2205/09
See application file for complete search history.

(56) References Cited

U.S. PATENT DOCUMENTS 5,184,465 A * 2/1993 Howard ................. B64C 25/22
                                                       244/102 R
5,310,139 A * 5/1994 Derrien ..................... F16F 9/18
                                                       244/104 FP
(Continued)

FOREIGN PATENT DOCUMENTS

DE   102004047559 A1   4/2006
EP       1900081 A1   3/2008
WO    03/043163 A1   5/2003

OTHER PUBLICATIONS

Search Report dated Mar. 31, 2016 in corresponding FR application No. 1554398.
(Continued)

*Primary Examiner* — Assres H Woldemaryam

(57) ABSTRACT

An electromechanical actuator includes an actuator that is translatable along an axis relative to a case and that is made up of a deployed part and a non-deployed part, which are following one another along the axis and which are respectively deployed and not deployed outside the case. The axial span of the deployed part varies proportionally opposite that of the non-deployed part as a function of the translated position of the actuator. The actuator also includes an electric motor for translating the actuator, which is supported by the case and is connected to the non-deployed part of the actuator by a transmission. The case defines an inner volume inside which the non-deployed part of the actuator, the motor and the transmission are arranged. The inner volume is, during operation of the actuator, pressurized while being filled with a gaseous medium.

12 Claims, 2 Drawing Sheets

(51) Int. Cl.
  *H02K 7/06* (2006.01)
  *B64C 25/24* (2006.01)
  *H02K 7/14* (2006.01)

(56) References Cited

U.S. PATENT DOCUMENTS

| | | | | |
|---|---|---|---|---|
| 5,944,285 | A * | 8/1999 | Royer | B64C 1/1453 244/129.4 |
| 6,311,927 | B1 * | 11/2001 | Elving | B64C 25/22 244/100 R |
| 2006/0266146 | A1 * | 11/2006 | Waide | F16H 25/2252 74/424.92 |
| 2011/0174924 | A1 * | 7/2011 | Ferraz | B64C 25/14 244/102 A |
| 2013/0233968 | A1 * | 9/2013 | Goodburn | B64C 25/34 244/102 A |
| 2014/0090551 | A1 * | 4/2014 | Roberts | F15B 15/261 91/41 |
| 2015/0114220 | A1 * | 4/2015 | Dropmann | F16J 1/12 92/5 R |
| 2016/0167770 | A1 * | 6/2016 | Toon | B64C 25/20 244/102 R |

OTHER PUBLICATIONS

Extended European Search Report dated Oct. 17, 2016 in corresponding EP Application No. 16169855.0.

* cited by examiner

ELECTROMECHANICAL ACTUATOR FOR CONTROLLING THE MOVEMENT OF A MOVING OUTER PART OF AN AIRCRAFT, AND AIRCRAFT INCLUDING ONE SUCH ELECTROMECHANICAL ACTUATOR

CROSS-REFERENCE TO RELATED APPLICATION

This application claims priority to French Patent Application No. 1554398 filed on May 18, 2015, the disclosure of which including the specification, the drawings, and the claims is hereby incorporated by reference in its entirety.

FIELD OF THE INVENTION

The present invention relates to an electromechanical actuator for controlling the movement of a moving outer part of an aircraft, as well as an aircraft including such an electromechanical actuator.

The invention thus examines the field of aeronautics, in which such electromechanical actuators are for example used for the movement and retraction of aircraft landing gear.

BACKGROUND OF THE INVENTION

Traditionally, such an electromechanical actuator comprises an actuator, typically a rod, which, by translation, deploys and retracts with respect to a case of the actuator, under the driving action of an electric motor supported by the case. A transmission connects the output of the motor, often rotating, to the end of the rod, opposite that deployed outside the case. In practice, during various maneuvers by the aircraft, the actuator is implemented in harsh environments, in which it is subject to liquid water, steam, oxygen from the air, dust, dirty spray, sand, etc., which, over time, tend to alter the operation of its actuator by corroding the electric motor and/or the transmission, as well as by attenuating their lubrication. To protect the motor and the transmission, it may be provided to arrange them in an inner volume of the case, but this solution quickly proves ineffective inasmuch as, by closing this inner volume, a relative vacuum is created therein when the rod is deployed outside the center volume, such that the corrosion agents listed above tend to penetrate therein easily, by aspiration and/or driving by the rod during the retraction of the latter: once these agents have penetrated the inside of the inner volume of the case, they alter the operation of the actuator, in the same way as when there are no arrangements related to the aforementioned inner volume.

SUMMARY OF THE INVENTION

The aim of the present invention is to propose an improved electromechanical aeronautic actuator, the resistance of which to harsh operating conditions is reinforced.

To that end, the invention relates to an electromechanical actuator for controlling the movement of a moving outer part of an aircraft, the electromechanical actuator comprising:
  a case,
  an actuator, that is translatable along an axis relative to the case and that is made up of a deployed part and a non-deployed part, which are following one another along the axis and which are respectively deployed and not deployed outside the case, the axial span of the deployed part varying proportionally opposite that of the non-deployed part as a function of the translated position of the actuator relative to the case, and
  an electric motor for translating the actuator, which is supported by the case and is connected to the non-deployed part of the actuator by a transmission,
wherein the case defines an inner volume inside which the non-deployed part of the actuator, the motor and the transmission are arranged,
wherein, during operation, the inner volume is pressurized while being filled with a gaseous medium having, irrespective of the translated position of the actuator, a pressure greater than or equal to a preset absolute value of at least 1.5 bars, and
wherein the actuator further comprises seals that seal the inner volume relative to the outside of the case so as to keep the inner volume pressurized.

The invention also relates to an aircraft, including:
  a chassis,
  an outer part, which is movable relative to the chassis, and
  an electromechanical actuator for controlling the movement of the outer part, this electromechanical actuator being as defined above, the case of the electromechanical actuator being secured to the chassis while its actuator is secured to the outer part.

One of the ideas at the base of the invention is to pressurize a tight inner volume of the case of the actuator, inside which one places the motor and the transmission between the output of this motor and the part of the actuator translating the actuator, provided not to deploy outside the actuator. In order to pressurize the inner volume while the actuator is working, the invention provides for filling this inner volume with a gaseous medium such that, irrespective of the translated position of the actuator, the absolute value of the pressure of the gaseous medium is preset to at least 1.5 bar, or even at least 2 bars, or even at least three bars, or more, while maintaining the pressurization of the inner volume by the seals, which seal this inner volume at each opening of the inner volume to the outside: thus, during the operation of the actuator, even when the actuator is moved maximally and is therefore the furthest outside the inner volume, the latter retains a pressure much higher than the atmospheric pressure, in other words, higher than the pressure of the air around the outside of the case. In particular, the absolute value of the pressure of the gaseous medium is provided such that, under all possible implementing conditions of the actuator according to the invention, related to the various maneuvers the can be considered for the aircraft, the pressure gradient does not change direction, the pressure inside the inner volume always being higher than that of the outside air. In this way, the aforementioned corrosion agents, such as liquid water, steam, oxygen from the air, dust, dirty spray, sand, etc., are effectively kept outside the inner volume of the case, thus greatly limiting or even eliminating the corresponding pollution of the gaseous medium filling this inner volume. Likewise, the pressurization of the inner volume of the actuator makes it possible to fully know the composition of the gaseous medium filling this inner volume: it is advantageously possible to choose a gas or a mixture of gases, which limits the natural inner corrosion of the actuator and/or limits the combined inner corrosion of the "fretting corrosion" type of the actuator and/or that makes it possible to do without an unoxidizable material for the engine and the transmission and/or that limits the deterioration of the lubricants of the engine and transmission. Furthermore, the pressurization of the inner volume of the case can advantageously be used to improve the sealing of the inner volume, by choosing and/or arranging at least some of the seals such that each of these elements still further seals the corresponding opening when the pressure of the inner volume is high. Examples of such seals will be outlined later. In all cases, it will be understood that this improvement in the tightness of the actuator typically makes it possible to make the inner volume hermetic and/or makes it possible only to lubricate the engine and transmission with oil, not using grease.

According to additional features and advantages of the electromechanical actuator according to the invention:
- the preset absolute value is at least 2 bars;
- the preset absolute value is at least 3 bars;
- the gaseous medium is made up of a neutral gas or a mixture of neutral gases;
- the seals comprise at least one sealing gasket, which is inserted between the case and the actuator, while being designed to be pressed against them under the effect of the pressure from the gaseous medium;
- the transmission is lubricated exclusively with oil;
- the actuator further comprises a gas supply device, suitable for recharging the gaseous medium when its pressure drops below the preset absolute value;
- the gas supply device comprises a pressurized gas source, which has a pressure strictly greater than the preset absolute value and that is connected to the inner volume of the case via a pressure regulator of the device that selectively opens or closes the passage between the gas source and the inner volume depending on whether the pressure of the gaseous medium is below the preset absolute value;
- the gas source is a cartridge supported by the case;
- the actuator further comprises overpressure release regulator, suitable for discharging part of the gaseous medium outside the case when the pressure of said gaseous medium drops below a predetermined threshold;
- the outer part is a landing gear.

BRIEF DESCRIPTION OF THE DRAWINGS

The invention will be better understood upon reading the following description, provided solely as an example and done in reference to the drawings, in which.

DETAILED DESCRIPTION OF THE PREFERRED EMBODIMENTS

Figure 1:
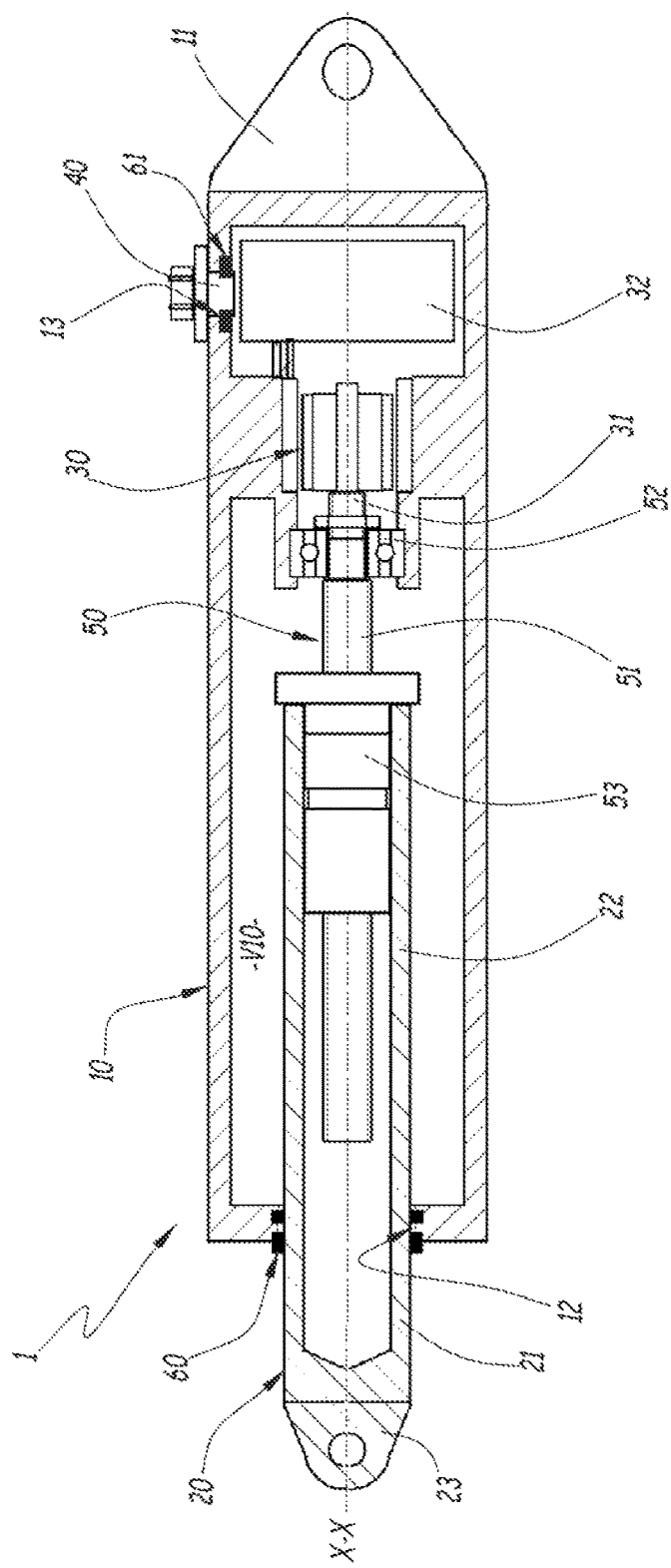
FIG. 1 is a longitudinal diagrammatic sectional view of an electromechanical actuator according to the invention.

FIG. 1 shows an electromechanical actuator 1. As one preferred example, this actuator 1 is onboard an aircraft and commands the movement, relative to the chassis of the aircraft, of the moving outer parts of this aircraft, such as its landing gear, for example. Other usage examples of the actuator 1 are provided in the introductory part of this document.

As shown in FIG. 1, the actuator 1 comprises a case 10, which can also be called body. This case 10 has a sufficient rigidity so as on the one hand to be secured to the chassis of the aircraft, for example at a fastening tab 11 of this case, and on the other hand to withstand the reactions resulting from the actuating forces generated by the actuator 1. In practice, the case 10 is for example made from metal or from a plastic-based composite material.

The case 10 is hollow and thus defines a free inner volume V10.

The actuator 1 also comprises a rod 20. For the actuator 1, this rod 20 forms an actuator that acts on one of the aforementioned moving outer parts of the aircraft, for example on its landing gear, to move this outer part relative to the chassis of the aircraft. The rod 20 defines a longitudinal central axis X-X along which this rod is translatable relative to the case 10. As shown in FIG. 1, the rod 20 extends, along the axis X-X, partially inside the inner volume V10 of the case 10, the rest of the rod 20 being outside this volume V10. In other words, along the axis X-X, the rod 20 is made up of two successive parts, i.e., a deployed part 21 and a non-deployed part 22 that is not deployed outside the case 10, the junction zone between these deployed 21 and non-deployed 22 parts being situated through an opening 12, defined by the case 10 so as to be centered on the axis X-X and connecting the inner volume V10 to the outside of the case.

Due to the translational mobility of the rod 20 along the axis X-X, the axial span of the deployed part 21 varies proportionally opposite that of the non-deployed part 22 based on the axial position of the rod 20 relative to the case 10. Thus, when the rod 20 is translated to the left in FIG. 1, the axial span of its deployed part 21 increases, while the axial span of its non-deployed part 22 decreases in a corresponding manner, until reaching a minimum span. Conversely, when the rod 20 is translated to the right, the axial span of its non-deployed part 22 increases, while the axial span of its deployed part 21 decreases in a corresponding manner, until reaching a minimal span. In all cases, i.e., irrespective of the axial position of the rod 20, its non-deployed part 22, which is more or less expansive compared to the span of its deployed part 21, remains inside the inner volume V10 of the case 10, while its deployed part 21 remains outside the case.

In practice, the deployed part 21 of the rod 20 is secured, directly or indirectly, to the aforementioned moving outer part to be actuated, at a corresponding fastening tab 23 of that part 21.

In order to translate the rod 20, the actuator 1 comprises an electric motor 30. The specificities of this motor 30 are not limiting inasmuch as it converts electricity powering it into a mechanical driving output. Typically, this driving output is rotational, selectively in both directions, around the axis X-X, the motor 30 including an output shaft 31, centered on the axis X-X and rotating around an axis, in both rotation directions. It will be noted that in the figure, the motor 30 is shown by a set of rectangles which, in practice, respectively correspond, for example, to a stator, an air gap, a binding band, magnets, a magnet holder, etc. Furthermore, this motor 30 here includes an electronic control board 32.

Irrespective of the embodiment of the electric motor 30, the latter is arranged inside the inner volume V10 of the case 10, as shown in FIG. 1. As shown in the figure, the volume V10 extends through the different components of the motor 30, going so far as to encompass its electronic board 32. In order to supply electricity to the motor 30 from outside the case 10, the latter defines an opening 13, which connects the inner volume V10 to the outside of the case, for example in a direction transverse to the axis X-X, and inside which a plug 40 is arranged for connecting to an electricity source, not shown, outside the actuator 1. The plug 40 may also be described as an electric connector.

Inside the inner volume V10 of the case 10, the electric motor 30, more specifically its output shaft 31, is connected to the non-deployed part 22 of the rod 20 by mechanical transmission 50: this transmission 50 transmits, if applicable while converting them, the movements from the driving output of the motor 30 to the rod 20 to translate the latter along the axis X-X relative to the case 10. As an example, known in itself and considered in FIG. 1, the transmission 50 includes a worm 51, which is coupled in rotation around the axis X-X to the output shaft 31 of the motor 30, with an interposition of rolling bearings or main bearings 52 with respect to the case 10, and a core 53, which is screwed around the screw 51 and blocked in rotation on itself around the axis X-X relative to the case 10, while being securely connected in translation along that axis to the non-deployed part 22 of the rod 20. Of course, this example does not limit the transmission 50, any embodiment of transmission between the driving output, irrespective of whether it rotates, of the motor 30 and the non-deployed part 22 of the translating rod 20 being able to be considered.

The inner volume V10 of the case 10 is filled with a gaseous medium pressurizing the inside of the case 10. Thus, this gaseous medium has a pressure whereof the absolute value is preset to at least 1.5 bars, preferably at least 2 bars, or even preferably at least 3 bars. It will be noted that this preset absolute value of the gaseous medium filling the inner volume V10 of the case 10 is effective once the actuator 1 is in use and irrespective of the translated position of the rod 20 along the axis X-X: in particular, even when the rod 20 is deployed maximally and its non-deployed part 22 therefore has a minimal axial span, the pressure in the inner volume V10 has at least the preset absolute value, or is greater than the latter.

In practice, the value selected for the pressure of the gaseous medium may vary depending on the usage context of the actuator 1, the idea being to preset a large enough value so that, under all possible operating conditions of the actuator 1 related to the various possible maneuvers for the aircraft, the pressure gradient between the inside and the outside of the case 10 does not change direction.

Owing to this pressurization of the inner volume V10 when the actuator 1 is operating, the pollution of this inner volume is limited or even avoided, preventing outside agents from penetrating therein, such as liquid water, steam, oxygen from the air, dirty spray, dust, sand, etc. More generally, the gaseous medium of the inner volume V10, in which the motor 30 and the transmission 50 bathe, is controlled regarding its composition, due to its relative overpressure with respect to the outside of the case 10. Unwanted components, such as the aforementioned outside agents, can therefore be excluded therefrom and prevented from penetrating therein. In the extension of the aforementioned considerations, the gaseous medium is advantageously made up of a neutral gas or a mixture of neutral gases, for example nitrogen: the inner corrosion of the actuator 1, both natural corrosion and combined corrosion of the "fretting corrosion" type, as well as the deterioration of the lubrication of the engine 30 and the transmission 50 are thus limited or even avoided.

Of course, for the pressurization of the inner volume V10 of the case 10 to be lasting, this volume V10 is made tight with respect to the outside. In particular, the openings 10 and 13 of the case 10 are respectively provided with seals able to maintain the relative pressurization of the gaseous medium filling the volume V10. For the opening 13, the corresponding seal(s), which are only shown diagrammatically under reference 61 and are for example fittings, need only have a static effect, inasmuch as this or these elements 61 statically seal the fixed interface between the case 10 and the connection plug 40, at the opening 13. Regarding the opening 12, the corresponding seal(s) consist of one or more seals 60 having a dynamic sealing effect, inasmuch as this or these seals 60 are designed to seal the moving interface between the case 10 and the translating rod 20, at the opening 12: according to one preferred and particularly advantageous arrangement, this or these dynamic sealing seals 60 are provided to be pressed against the case 10 and the rod 20 under the effect of pressure from the gaseous medium filling the inner volume V10 of the case 10. In this way, it will be understood that the higher the inner pressure of the case 10 is, the more the sealing effect produced by the seal(s) 60 is reinforced. As one non-limiting example, the seal(s) 60 are lip seals oriented from the inside toward the outside of the opening 12.

According to one optional arrangement, the transmission 50 is lubricated exclusively with oil, i.e., using a liquid lubricant, without using a pasty or solid lubricant, such as grease. The use of such oil-based lubrication is made possible by the control of the composition of the gaseous medium filling the inner volume V10 of the case 10 and by the high level of sealing of this volume V10, in particular at the openings 12 and 13 of the case. Indeed, as explained above, the leakage risks of this liquid lubrication and/or pollution of this lubrication are controlled.

It will be understood that the presence of the pressurized gaseous medium, filling the inner volume V10 of the case 10, substantially extends the lifetime of the actuator 1, by limiting or even avoiding its deterioration or wear due to aggressive agents, in particular originating from outside the actuator. This being the case, the presence of this pressurized gaseous medium is not essential to the operation of the actuator 1: if this pressurized gaseous medium disappears, for example in case of a break in the sealing of the inner volume V10, both at the openings 12 and 13 and at another location of the case 10, the actuator 1 is functionally operational, its rod 20 being equally able to be translated by the motor 30 as it can be in the presence of the aforementioned gaseous medium. Of course, when the gaseous medium is not present, the aforementioned problems of corrosion and wear will occur for the actuator 1, in the same manner as for the actuators of the prior art.

Figure 2:
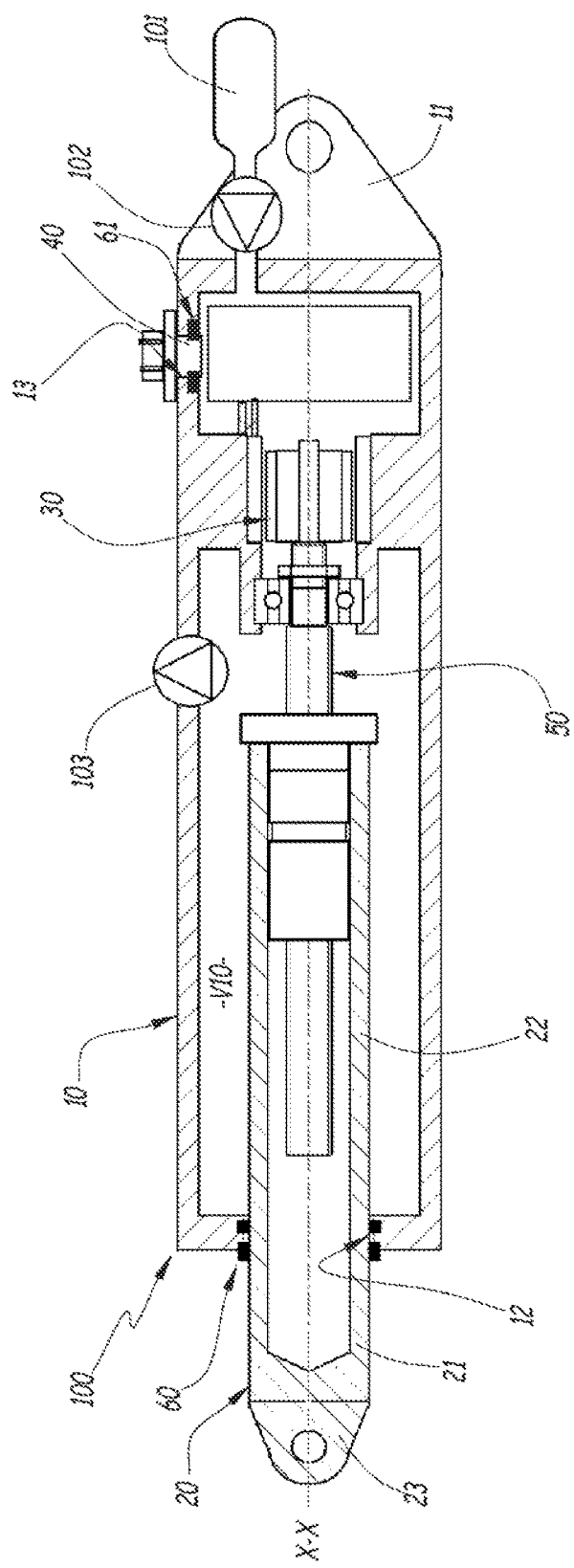
FIG. 2 is a view similar to FIG. 1, showing an alternative embodiment according to the invention.

FIG. 2 shows an alternative of the electromechanical actuator 1, referenced 100. This actuator 100 has the same arrangements as the actuator 1 and in particular includes the same components, such that, subsequently and in FIG. 2, these components are designated using the same references as those previously used, in connection with FIG. 1.

The actuator 100 differs from the actuator 1 by additional arrangements, namely:

- a pressurized gas cartridge 101, the inner pressure of which is high inasmuch as it is significantly above the preset value for the minimum pressure of the gaseous medium filling the inner volume V10 of the case 10, and that is connected to that inner volume V10 by a pressure regulator 102, and
- a pressure regulator 103, which directly connects the inner volume V10 to the outside of the case 10, through a wall of that case.

The pressure regulator 102 is designed so as to selectively open or close the passage between the cartridge 101 and the inner volume V10 depending on whether the pressure of the gaseous medium filling that volume V10 is lower than the aforementioned preset value: thus, when the pressure of the gaseous medium drops below the preset value, the pressure regulator 102 opens the aforementioned passage such that the cartridge 101 recharges the gaseous medium, supplying it with pressurized gas. Once the pressure of the gaseous medium returns to a point above the preset value, if applicable with a given deviation, the pressure regulator 102 closes. It will be understood that the cartridge 101 and the pressure regulator 102 jointly form a gas supply device, able to automatically reinflate the gaseous medium of the inner volume V10 when that inner volume deflates.

According to one practical and easy-to-implement provision, the cartridge 101 is supported by the case 10, as shown diagrammatically in FIG. 2. That being the case, the cartridge 101 can be made as an independent component of the actuator 100. Furthermore, the embodiment of the cartridge 101 is not limiting, inasmuch as this cartridge is only one example embodiment of a high-pressure gas source, to be connected to the inner volume V10 of the case 10 via the pressure regulator 102.

The pressure regulator 103 is in turn designed to open when the pressure of the gaseous medium of the inner volume V10 passes above a predetermined pressure threshold that is midway between the high pressure of the cartridge 101 and the aforementioned preset value: thus, if a substantially high overpressure, i.e., greater than or equal to the aforementioned predetermined threshold, appears in the inner volume V10, the pressure regulator 103 releases this overpressure, by discharging part of the gaseous medium of the volume V10 outside the case 10. The appearance of such an overpressure may for example result from a failure of the pressure regulator 102. In all cases, the pressure regulator 103 corresponds, in a way, to a safety valve, preventing excessive pressurization of the inside of the case 10.

As one non-limiting example, the pressure regulators 102 and 103 are valves, respectively tared to the preset value and tared to the predetermined threshold.

Furthermore, various arrangements and alternatives to the electromechanical actuators 1 and 101 described thus far may be considered.

What is claimed is:

1. An electromechanical actuator for controlling the movement of a moving outer part of an aircraft, the electromechanical actuator comprising:
   a case,
   an actuating member, that is translatable along an axis relative to the case and that is made up of a deployed part and a non-deployed part, which are following one another along the axis and which are respectively deployed and not deployed outside the case, the axial span of the deployed part varying proportionally opposite that of the non-deployed part as a function of the translated position of the actuating member relative to the case,
   an electric motor for translating the actuating member, which is supported by the case and is connected to the non-deployed part of the actuating member by a transmission mechanism, the case defining an inner volume inside which the non-deployed part of the actuating member, the motor and the transmission mechanism are arranged, and
   sealing elements that seal the inner volume relative to the outside of the case, wherein the inner volume is pressurized by being filled with a gaseous medium so that in use, irrespective of the translated position of the actuating member, the gaseous medium has a pressure greater than or equal to a preset absolute value of at least 1.5 bars, the sealing elements being provided to keep the inner volume pressurized.

2. The electromechanical actuator according to claim 1, wherein the preset absolute value is at least 2 bars.

3. The electromechanical actuator according to claim 1, wherein the preset absolute value is at least 3 bars.

4. The electromechanical actuator according to claim 1, wherein the gaseous medium is made up of a neutral gas or a mixture of neutral gases.

5. The electromechanical actuator according to claim 1, wherein the sealing elements comprise at least one sealing gasket, which is inserted between the case and the actuating member, while being designed to be pressed against them under the effect of the pressure from the gaseous medium.

6. The electromechanical actuator according to claim 1, wherein the transmission mechanism is lubricated exclusively with oil.

7. The electromechanical actuator according to claim 1, wherein the actuator further comprises a gas supply device, suitable for recharging the gaseous medium when the pressure of the gaseous medium drops below the preset absolute value.

8. The electromechanical actuator according to claim 7, wherein the gas supply device comprises a pressurized gas source, which has a pressure strictly greater than the preset absolute value and that is connected to the inner volume of the case via a pressure regulator of the device that selectively opens or closes the passage between the gas source and the inner volume depending on whether the pressure of the gaseous medium is below the preset absolute value.

9. The electromechanical actuator according to claim 8, wherein the gas source is a cartridge supported by the case.

10. The electromechanical actuator according to claim 7, wherein the actuator further comprises overpressure release regulator, suitable for discharging part of the gaseous medium outside the case when the pressure of said gaseous medium passes above a predetermined threshold.

11. An aircraft, including:
    a chassis,
    an outer part, which is movable relative to the chassis, and
    an electromechanical actuator for controlling the movement of the outer part, this electromechanical actuator being according to claim 1, the case of the electromechanical actuator being secured to the chassis while an actuating member of the electromechanical actuator is secured to the outer part.

12. The aircraft according to claim 11, wherein the outer part is a landing gear.

* * * * *